(12) United States Patent
Nampo

(10) Patent No.: US 11,216,224 B2
(45) Date of Patent: Jan. 4, 2022

(54) PRINTING APPARATUS WITH CONTROLLER CONFIGURED TO DETERMINE REGISTERED STATUS OF CONNECTED DEVICE

(71) Applicant: BROTHER KOGYO KABUSHIKI KAISHA, Nagoya (JP)

(72) Inventor: Hiromichi Nampo, Kiyosu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/017,599

(22) Filed: Sep. 10, 2020

(65) Prior Publication Data

US 2021/0096791 A1    Apr. 1, 2021

(30) Foreign Application Priority Data

Sep. 30, 2019 (JP) .............................. JP2019-179351

(51) Int. Cl.
*G06F 3/12* (2006.01)

(52) U.S. Cl.
CPC .......... *G06F 3/1222* (2013.01); *G06F 3/1236* (2013.01); *G06F 3/1238* (2013.01); *G06F 3/1292* (2013.01); *G06F 3/1293* (2013.01)

(58) Field of Classification Search
None
See application file for complete search history.

(56) References Cited

U.S. PATENT DOCUMENTS

| 2005/0108547 | A1* | 5/2005 | Sakai | G06F 21/608 |
| | | | | 713/182 |
| 2016/0011824 | A1* | 1/2016 | Ishimura | G06F 3/1236 |
| | | | | 358/1.15 |
| 2016/0019013 | A1* | 1/2016 | Ido | G06F 3/1238 |
| | | | | 358/1.15 |

FOREIGN PATENT DOCUMENTS

| JP | 2017-510217 A | 4/2017 |
| JP | 2018-183901 A | 11/2018 |
| WO | 2015/102960 A1 | 7/2015 |

* cited by examiner

*Primary Examiner* — Thomas D Lee
(74) *Attorney, Agent, or Firm* — Kenealy Vaidya LLP

(57) ABSTRACT

A printing apparatus includes: a transporter; a print device; a communication interface performing a wireless communication with a plurality of external devices; a storage; and a controller performing: registering device information of specific external device in the storage; determining whether the device information of one external device newly connected to the printing apparatus is registered in the storage; when it is determined that the device information is not registered, making connection to the one external device a suspension state; prompting the external device registered in the storage to confirm whether to release the suspension state of the one external device; receiving a notification from the external device registered; and in a case the received notification indicates releasing permission of the suspension state, releasing the suspension state in the one external device.

6 Claims, 10 Drawing Sheets

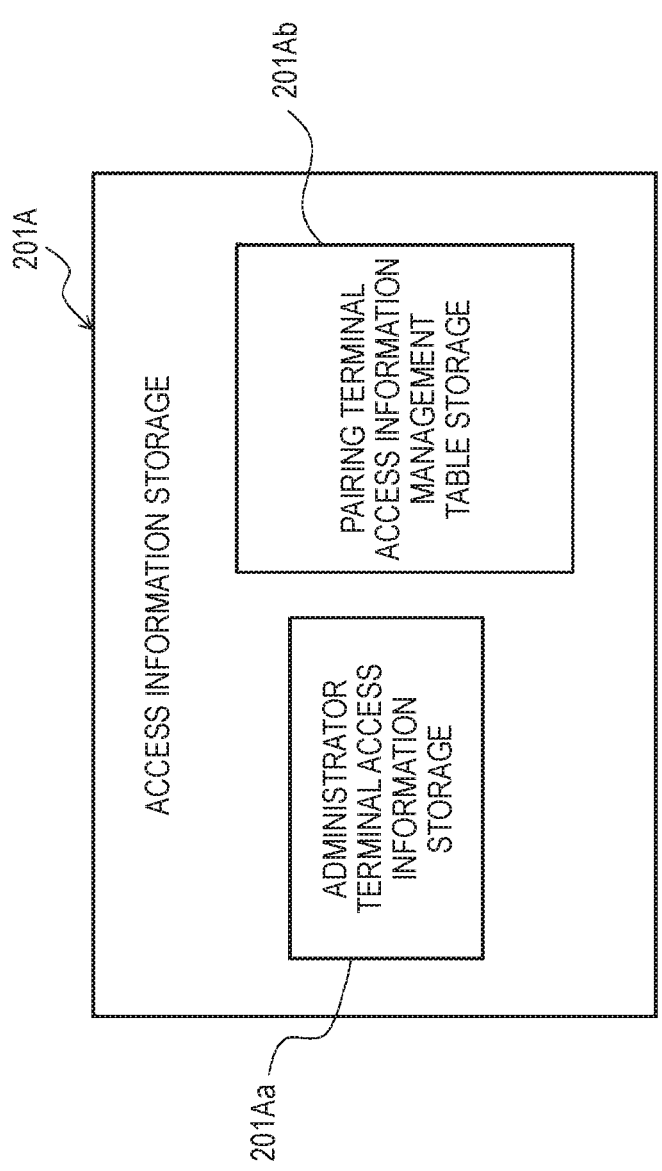

*FIG. 5*

PAIRING TERMINAL ACCESS INFORMATION MANAGEMENT TABLE

| REGISTRATION FLAG | ACCESS ID | LINK KEY | PRINT DATA |
|---|---|---|---|
| ☐ | Tanmatsu/801F | *** | 80B250 |
| ☑ | Eigyou-1010-8 | *** | — |
| ☑ | Kikaku-1012-3 | *** | — |
| ☐ | No.24phone | *** | — |
| ☑ | Eigyou-1010-5 | *** | — |
| | ... | ... | ... |

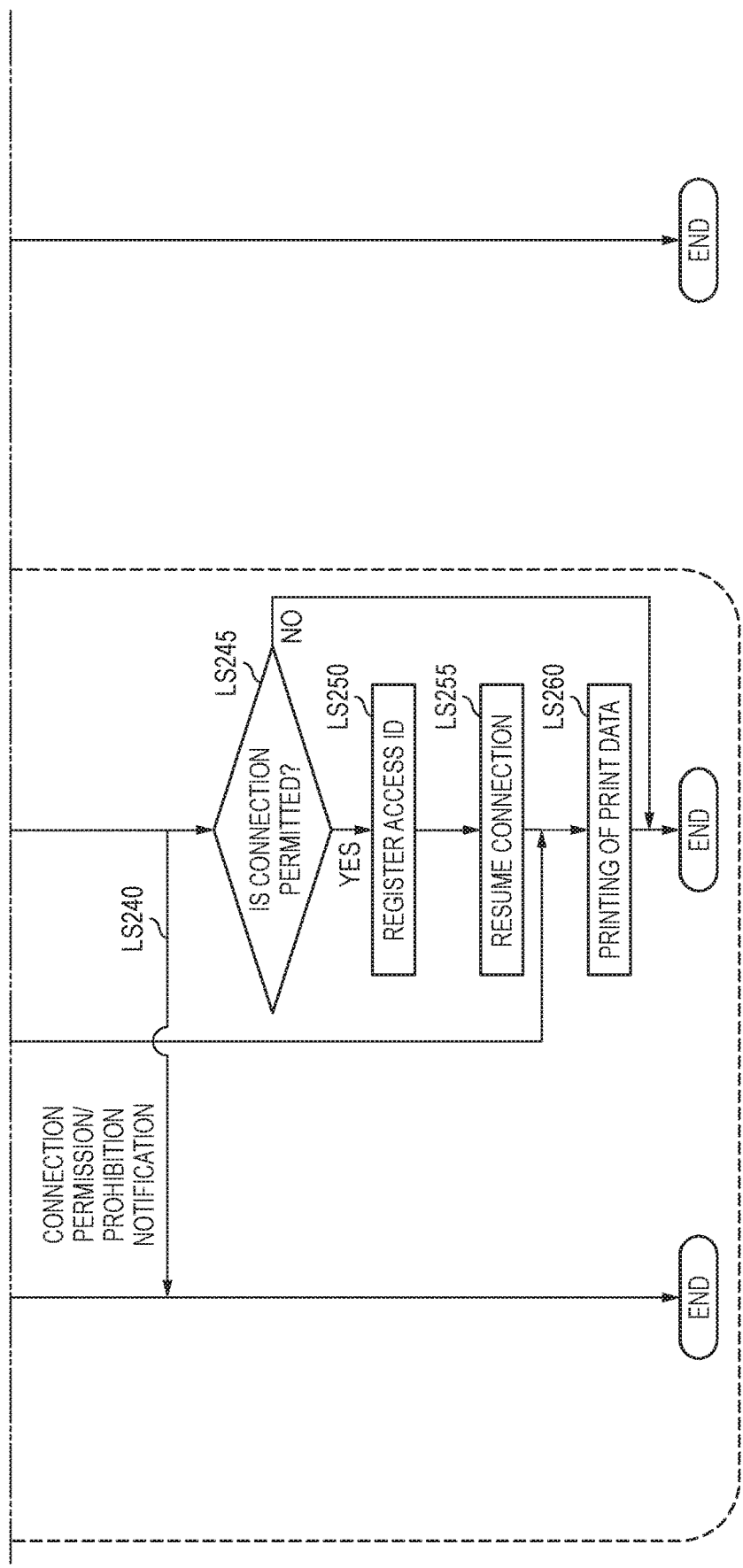

PRINTING APPARATUS WITH CONTROLLER CONFIGURED TO DETERMINE REGISTERED STATUS OF CONNECTED DEVICE

CROSS-REFERENCE TO RELATED APPLICATIONS

This application claims priority from Japanese patent application No. 2019-179351 filed on Sep. 30, 2019, the entire subject-matter of which is incorporated herein by reference.

TECHNICAL FIELD

The present disclosure relates to a printing apparatus that performs wireless communication with an external device.

BACKGROUND

There has been known a related-art printer communicating with a plurality of communication devices by wireless communication. In this related-art printer, when print data is received from any of a plurality of communication devices in a state where print processing based on the print data from any of the plurality of communication devices is not performed, until the print processing based on the print data is completed, control is performed so that print data is not received from a communication device other than a first communication device that is a transmission source of the print data among the plurality of communication devices.

However, when it is possible to connect to a plurality of external devices by wireless communication like the related-art printer, if it is possible to print by unnecessarily connecting to an unspecified external device, it is not preferable from the viewpoint of ensuring security. In contrast, it is difficult for the printing apparatus itself to confirm whether safety in security of an operation terminal requesting the connection to the printing apparatus is ensured, and there is a demand for a configuration that can determine the execution of the requested connection.

SUMMARY

Illustrative aspects of the present disclosure provide a printing apparatus capable of enhancing security in wireless communication with an operation terminal.

According to one illustrative aspect of the present disclosure, there may be provided a printing apparatus comprising: a transporter configured to transport a printing medium; a print device configured to form a print on the printing medium; a communication interface configured to perform a wireless communication with a plurality of external devices by a mutual recognition wireless communication method; a storage storing information; and a controller configured to perform: registering device information of specific external device in the storage; determining whether the device information of one external device newly connected to the printing apparatus via the communication interface is registered in the storage; in a case it is determined that the device information is not registered, making connection to said one external device a suspension state; prompting the external device registered in the storage to confirm whether to release the suspension state of said one external device; receiving, from the external device registered, a notification of permission/prohibition of release of the suspension state; and in a case the received notification indicates releasing permission of the suspension state, releasing the suspension state in said one external device.

According to the present disclosure, security can be enhanced in wireless communication with an operation terminal.

BRIEF DESCRIPTION OF DRAWINGS

Illustrative embodiments of the disclosure will be described in detail based on the following figures, wherein:

FIG. 3 is a diagram illustrating an administrator terminal access information storage and a pairing terminal access information management table storage provided in a storage area of an access information storage;

FIG. 4 is a diagram illustrating recorded contents of the administrator terminal access information storage;

FIG. 5 is a diagram illustrating recorded contents of the pairing terminal access information management table storage;

FIGS. 9A and 9B are sequence charts illustrating a processing procedure of the connection permission/prohibition confirmation sequence 2 executed by the control circuit of the label printer and the CPU of each operation terminal.

DETAILED DESCRIPTION

Hereinafter, an embodiment of the present disclosure will be described with reference to the drawings.

<Configuration of Print Processing System>

First, an overall configuration of the print processing system of the present embodiment will be described with reference to FIG. 1.

Figure 1:
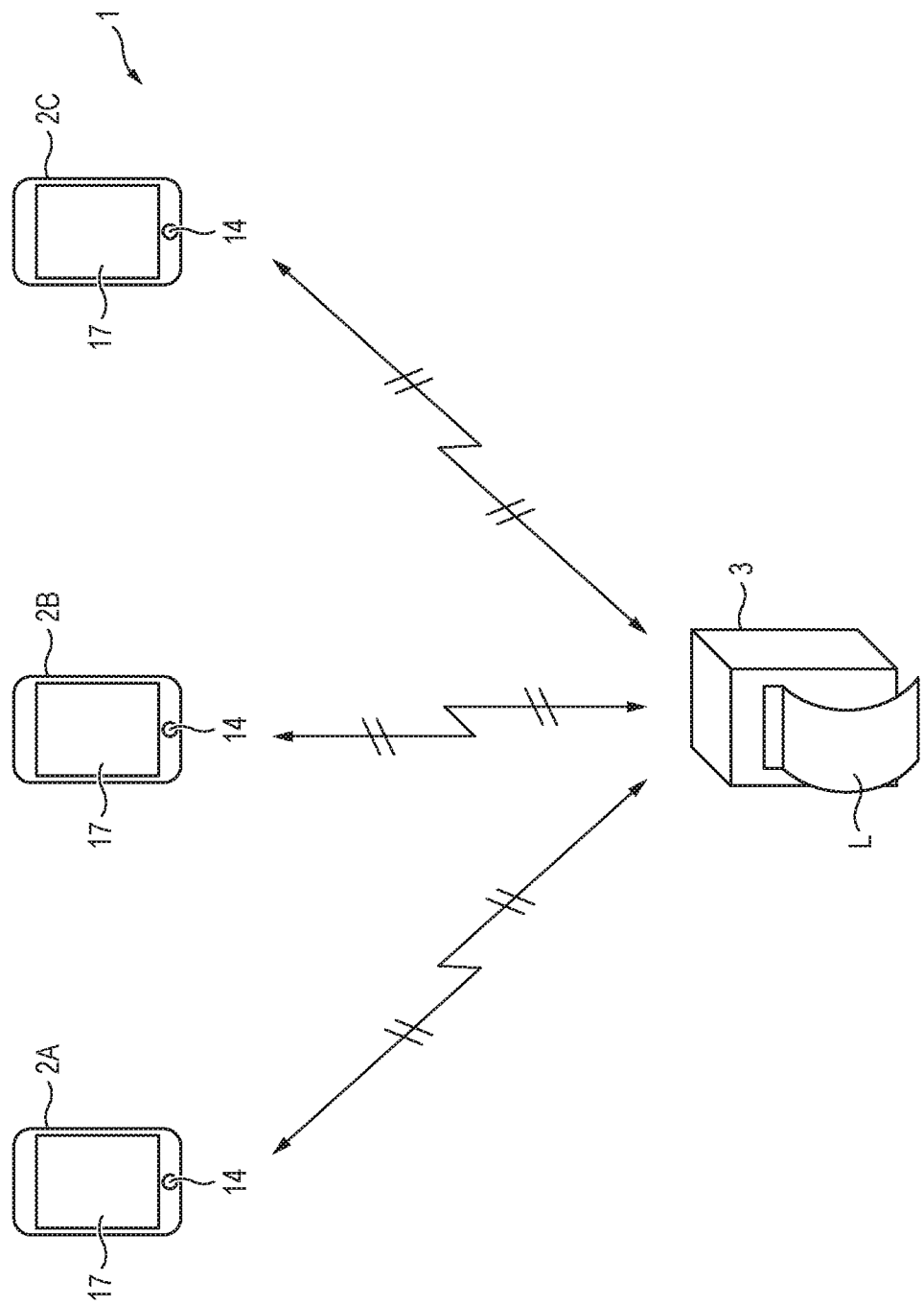
FIG. 1 is a system configuration diagram illustrating an overall configuration of a print processing system according to an embodiment of the present disclosure.

As illustrated in FIG. 1, a print processing system 1 according to the present embodiment includes a plurality of operation terminals, here, three operation terminals 2A, 2B, and 2C (hereinafter, when the operation terminals 2A, 2B, and 2C are collectively referred to without any distinction, the operation terminals are simply referred to as an "operation terminal 2"), and a label printer 3. The operation terminal 2 and the label printer 3 are wirelessly connected to each other by an appropriate mutual recognition wireless communication method such as Wi-Fi (registered trademark) or Bluetooth (registered trademark) so that the operation terminal 2 and the label printer 3 can communicate with each other. The label printer 3 corresponds to an example of a printing apparatus, and the operation terminal 2 corresponds to an example of an external device.

The operation terminal 2 is a so-called smartphone including an operation button 14 and a touch panel 17 which is a display unit having a display function and capable of being operated by contact. The operation terminal 2 is not limited to the smartphone, and may be a so-called feature phone, tablet computer, notebook computer, desktop computer, or the like, and the display unit may not be the touch panel 17.

The label printer 3 transmits and receives various kinds of information and instruction signals to and from the operation terminal 2, and creates a print label L provided with print of desired text, image or the like based on a user's operation on the operation terminal 2.

Next, a functional configuration of the print processing system 1 will be described with reference to FIG. 2.

<Functional Configuration>

Figure 2:
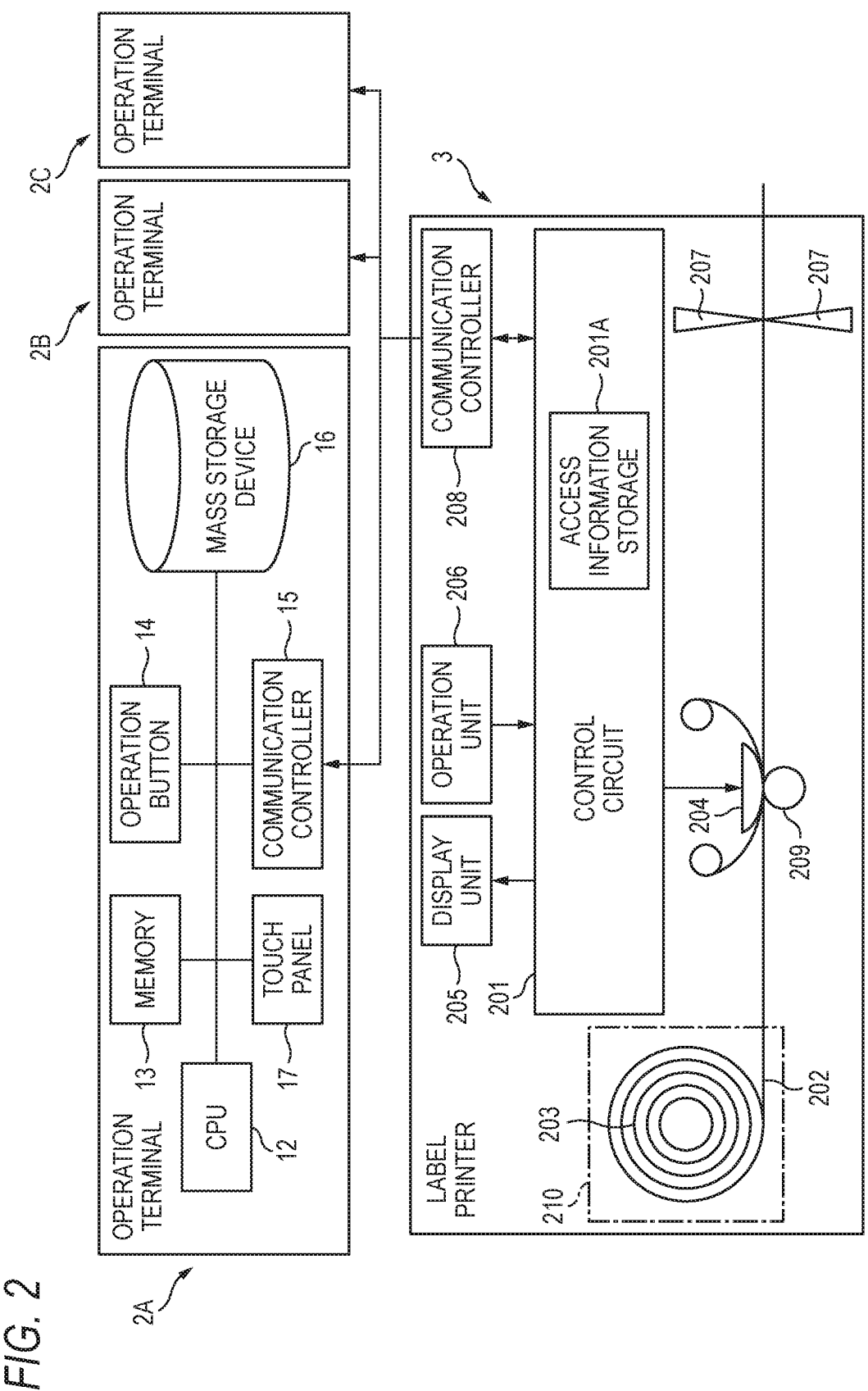
FIG. 2 is a functional block diagram illustrating a functional configuration of the print processing system.

As illustrated in FIG. 2, the operation terminal 2A includes a CPU 12, a memory 13 composed of a RAM and a ROM, the operation button 14, a communication controller 15, a mass storage device 16 such as a flash memory, and the touch panel 17.

In the RAM of the memory 13, for example, print data created by the user appropriately operating the touch panel 17 and corresponding to a desired print content to be written on the print label L is stored.

The CPU 12 controls the entire operation terminal 2 by executing various programs stored in the ROM of the memory 13 or the mass storage device 16 while using a temporary storage function of the RAM of the memory 13.

The communication controller 15 controls communication performed with the label printer 3.

The mass storage device 16 is, for example, a main body memory, but is not limited thereto, and may be an appropriate external memory such as an SD memory card.

In FIG. 2, although detailed functions of the operation terminals 2B and 2C are omitted, the operation terminals 2B and 2C have the same detailed functions as the operation terminal 2A.

The label printer 3 includes a control circuit 201, a display unit 205, an operation unit 206, a communication controller 208, a tape roll holder unit 210, a print head 204, a cutter 207, and a transport device 209. The control circuit 201 corresponds to an example of the controller described in the claims, the communication controller 208 corresponds to an example of the communication unit described in the claims, the print head 204 corresponds to an example of the print unit described in the claims, and the transport device 209 corresponds to an example of the transport unit described in the claims.

The control circuit 201 is composed of a CPU, a RAM, a ROM, a flash memory and the like, and includes an access information storage 201A. Details of the access information storage 201A will be described later. In the ROM, a processing program for causing the CPU of the control circuit 201 to execute each procedure of sequence charts illustrated in FIGS. 7 and 9 described later is stored.

The communication controller 208 controls communication performed with the communication controller 15 of the operation terminal 2.

A tape roll 203 (which is originally a spiral shape but is illustrated as concentric circles for simplicity) around which a tape 202 is wound can be attached to and detached from the tape roll holder portion 210 (or a cartridge equipped with the tape roll 203 can be attached thereto and detached therefrom). The tape 202 corresponds to an example of the printing medium described in the claims.

The transport device 209 is provided to face the print head 204 and transports the tape 202 fed out from the tape roll 203.

The print head 204 prints on the tape 202 transported by the transport device 209 based on the print data received from the operation terminal 2.

The cutter 207 cuts the tape 202 after being subjected to printing into a predetermined length to form the print label L.

The display unit 205 displays various kinds of information input from the control circuit 201 to the user.

The operation unit 206 inputs various kinds of information and instructions to the control circuit 201 through an operation by the user.

<Management of Access Information and the Like>

Here, as described above, the label printer 3 can communicate with the plurality of operation terminals 2 by the mutual recognition wireless communication via the communication controller 208. In this example, the label printer 3 complies with the Bluetooth (registered trademark) standard described above, and exchanges access information, which is identification information such as a Bluetooth address of each of the plurality of operation terminals 2 that are within the communication range of the label printer 3 at that time, with each operation terminal 2 and is in a pairing state in which the label printer 3 and the operation terminal 2 can be mutually identified and recognized. The access information corresponds to an example of device information described in the claims.

Then, in that state, by appropriately operating either the operation terminal 2 or the label printer 3 by the user, the operation terminal 2 and the label printer 3 can be brought into a connected state in which data transmission/reception by the mutual recognition wireless communication is being executed by a known method. The label printer 3 in the example of the present embodiment can transmit and receive information such as print data to and from multiple operation terminals from among the plurality of operation terminals 2 that are in the pairing state at the same time in the connected state, but a print data transmission/reception process itself can accept only one operation terminal at the same time.

Furthermore, if printing is possible by unnecessarily connecting to an unspecified operation terminal 2, it is not preferable from the viewpoint of ensuring security. For that reason, in the present embodiment, the operation terminal 2 is classified into three types, that is, an administrator terminal, a registered terminal, and an unregistered terminal, and access information of the administrator terminal, the registered terminal, and the unregistered terminal is managed, thereby ensuring safety in security in wireless communication. The administrator terminal and the registered terminal correspond to an example of specific device information described in the claims.

For example, as illustrated in FIG. 3, an administrator terminal access information storage 201Aa and a pairing terminal access information management table storage 201Ab are provided in a storage area of the access information storage 201A. It is desirable to provide the access information storage 201A in a storage area of a flash memory (not particularly illustrated) provided in the control circuit 201 in such a way that stored contents of administrator terminal access information storage 201Aa and the pairing terminal access information management table storage 201Ab can be maintained even if the power supply is turned OFF. The access information storage 201A corresponds to an example of the storage described in the claims.

The administrator terminal access information storage 201Aa stores only one administrator terminal access information which is arbitrarily registered and set in advance by the user of the label printer 3 by a separate setting operation process via the display unit 205 and the operation unit 206 and information related thereto. This administrator terminal access information is access information of the administrator terminal owned by the administrator who is one of the users, and this administrator is a user who can judge whether it is safe even if an unregistered terminal corresponding to predetermined access information is connected to the label printer 3 by wireless communication from the viewpoint of security.

For example, as illustrated in FIG. 4, the administrator terminal access information storage 201Aa stores administrator terminal access information ("access ID" in the figure, the same applies hereinafter) and a link key and email address corresponding thereto. The link key is key information required when the label printer 3 transits from the pairing state with the administrator terminal to the connected state in which data can be transmitted and received in the mutual recognition wireless communication method. The email address is address information used when sending mail to the administrator terminal via a general telephone line or the Internet.

For example, as illustrated in FIG. 5, the pairing terminal access information management table storage 201Ab stores a pairing terminal access information management table in which access information ("access ID" in the figure, the same applies hereinafter) of a plurality of operation terminals 2 that the label printer 3 obtained by performing pairing in the past and information related to each access information are listed. Since a storage capacity of the pairing terminal access information management table storage 201Ab is limited, the pairing terminal access information management table is managed by a so-called First-In First-Out (FIFO) by which the oldest access information is deleted and new access information is sequentially accumulated so as to be newly stored.

In the pairing terminal access information management table of the illustrated example, a plurality of pieces of access information obtained in the past and respective registration flags, link keys, and print data corresponding to the respective pieces of access information are recorded.

The registration flag is a flag for recording whether the operation terminal 2 of the corresponding access information is registered as the registered terminal, and in the example illustrated in the figure, a state in which the flag is set is indicated by writing a check mark. The registered terminal is the operation terminal 2 that is approved as safe even if the operation terminal 2 is connected to the label printer 3 by wireless communication from the viewpoint of security according to the judgment of the administrator, and as in the illustrated example, a check mark (the flag content is "true") is recorded and registered in the corresponding registration flag. Regarding registration of the registered terminal, any user other than the administrator of the label printer 3 may arbitrarily register and set in advance. Related information (link key and the like) corresponding to the access information of the registered terminal thus registered is excluded from deletion targets by the FIFO or the like and is permanently stored in the pairing terminal access information management table.

On the contrary, in the pairing terminal access information management table, the operation terminal 2 corresponding to the access information for which the check mark is not recorded in the registration flag (that is, the flag content is "false") and remains unregistered is regarded as the unregistered terminal. The unregistered terminal is the operation terminal 2 for which security is not confirmed by the judgment of the administrator described above, and the related information (link key and the like) corresponding to the access information of such an unregistered terminal becomes a deletion target by the FIFO or the like and is deleted in order from the oldest one.

In the print data, print data most recently received from the operation terminal 2 of the corresponding access information or a storage area of the print data is recorded, and in the illustrated example, the top address of an area for storing the print data in the RAM of the control circuit 201 is recorded.

<Connection Permission/Prohibition Confirmation of Unregistered Terminal by Label Printer>

Hereinafter, a specific sequence of connection permission/prohibition confirmation of the unregistered terminal by the label printer 3 according to the present embodiment will be described. Here, regarding the connection permission/prohibition confirmation, two sequences are used properly depending on whether the administrator terminal is within the communication range R of the label printer 3.

<When Administrator Terminal is within Communication Range: Sequence 1>

Figure 6:
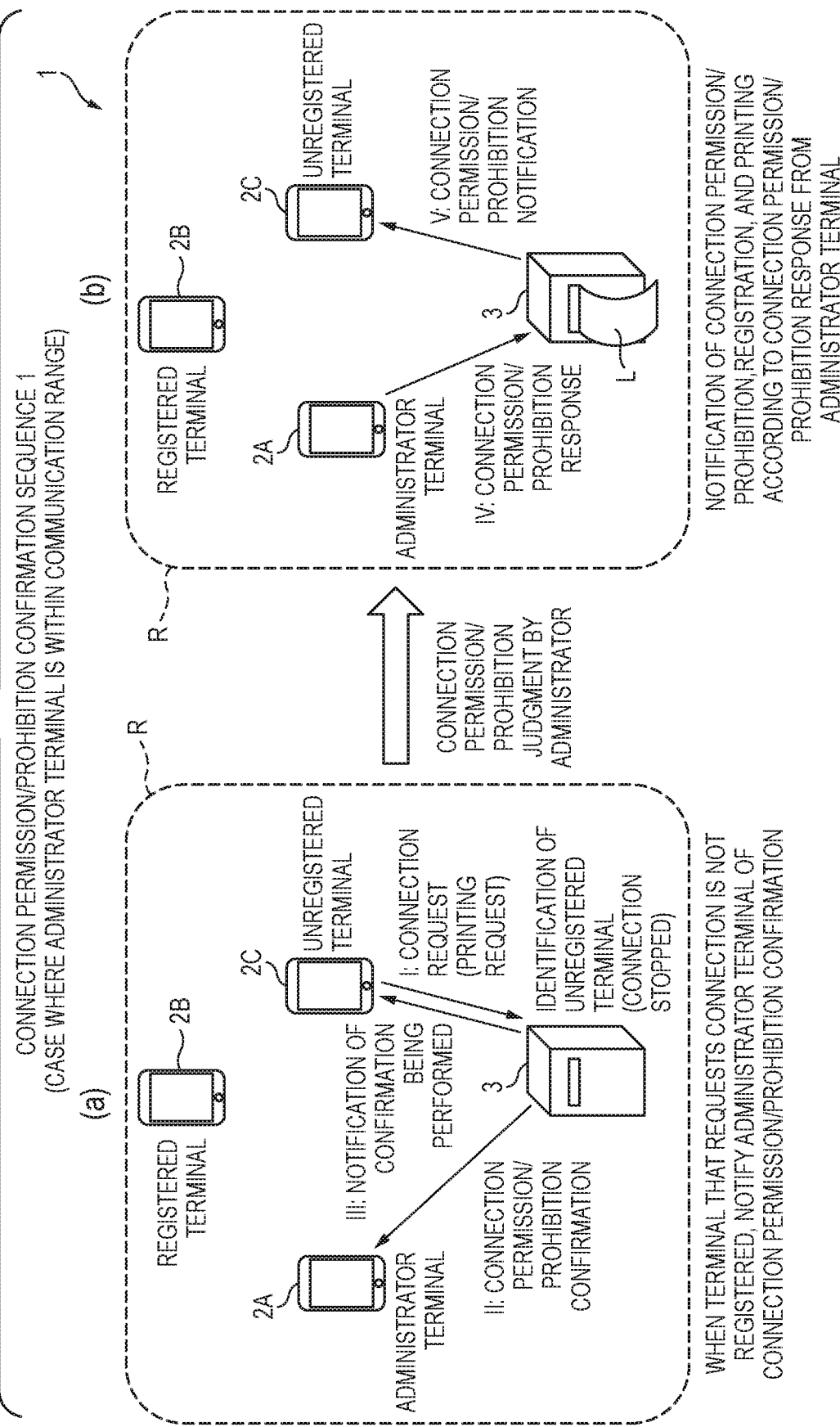
FIG. 6 illustrates steps of connection permission/prohibition confirmation sequence 1 when an administrator terminal is within a communication range, where section (a) of FIG. 6 is a step chart before the connection permission/prohibition judgment, and section (b) of FIG. 6 is a step chart after the connection permission/prohibition judgment.

For example, as illustrated in FIG. 6, when the administrator terminal is within the communication range R of the label printer 3, the connection permission/prohibition confirmation sequence 1 is executed in the following steps. In the example illustrated in the figure, the operation terminal 2A is illustrated as the administrator terminal 2A, the operation terminal 2B is illustrated as the registered terminal 2B, and the operation terminal 2C is illustrated as the unregistered terminal 2C (the same applies hereinafter).

First, in section (a) on the left side of FIG. 6, when a predetermined operation terminal 2 transmits a connection request (printing request) to the label printer 3 to print the print data, the link key is exchanged and the connected state is temporarily established, and the operation terminal 2 also transmits the print data together with the access information (I: connection request (printing request)). The label printer 3 that receives this connection request identifies whether access information of the transmission source of the print data is the access information of the registered terminal 2B (or administrator terminal 2A) or the access information of the unregistered terminal 2C by collating the access information with the pairing terminal access information management table. Although not particularly illustrated here, when the transmission source of the connection request can be identified as the registered terminal 2B, it is only necessary to print the received print data as it is and continue the connected state, and execution of the connection permission/prohibition confirmation sequence is unnecessary. The operation terminal 2 targeted for identification as described above corresponds to an example of one external device described in the claims.

On the other hand, when the transmission source of the connection request is identified as the unregistered terminal 2C, the label printer 3 temporarily stops the connected state while storing the received print data, and then transmits a connection permission/prohibition confirmation notification to the administrator terminal 2A that is within the communication range R together with the access information of the unregistered terminal 2C to prompt the permission/prohibition judgment of connection (II: connection permission/prohibition confirmation). The state in which the connected state is stopped as described above corresponds to an example of the suspension state of connection described in the claims, and the connection permission/prohibition confirmation notification corresponds to an example of the confirmation request notification described in the claims. At this time, the label printer 3 replies a notification-of-confirmation-being-performed indicating that the connection permission/prohibition is being confirmed to the unregistered terminal 2C that is the transmission source of the connection request (III: notification-of-confirmation-being-performed).

Then, the administrator who receives the connection permission/prohibition confirmation notification judges whether the connection is permitted by referring to the access information, and as illustrated in section (b) on the right side of FIG. 6, a connection permission/prohibition response reflecting the judgment content thereof is transmitted from the administrator terminal 2A to the label printer 3 (IV: connection permission/prohibition response). This connection permission/prohibition response corresponds to an example of the notification of permission/prohibition of release of the suspension state described in the claims. The label printer 3 which receives the connection permission/prohibition response transmits a connection permission/prohibition notification indicating the same content as the judgment content thereof to the unregistered terminal 2C (V: connection permission/prohibition notification), and then executes registration and printing of the unregistered terminal 2C according to the content of the judgment content.

Specifically, when the judgment content of the connection permission/prohibition response is a content of permitting the connection the access information of the unregistered terminal 2C is registered in the pairing terminal access information management table (a check mark is recorded in the corresponding registration flag), and the print data already received is printed to create the print label L. The connection permission/prohibition response having the content of permitting connection as described above corresponds to an example of the notification of release permission of the suspension state described in the claims. When the judgment content of the connection permission/prohibition response is a content of rejecting the connection, the connection permission/prohibition confirmation sequence 1 is ended without performing registration or printing.

<Regarding OS of Operation Terminal Applicable in the Present Embodiment>

For example, when the operation terminal 2 is a smartphone, there are a plurality of types of operating systems (hereinafter, appropriately referred to as "OS"), and the connection mode with the label printer 3 by wireless communication may differ depending on the OS. For example, when the OS is iOS (registered trademark), the link key is exchanged between the label printer 3 and the operation terminal 2, and then the operation terminal 2 and the label printer 3 are further connected to each other so that data can be transmitted and received to thereby implement the connected state described above. The iOS described above corresponds to an example of the first OS described in the claims.

In the case of such a type of OS, the connected state is basically maintained even after the print data and the like is transmitted and received in the connected state with the label printer 3. For that reason, even if the connected state with the unregistered terminal 2C is temporarily established, it is desirable to stop the connected state on the label printer 3 side until a connection permission/prohibition response having the judgment content of permitting the connection is received from the administrator terminal 2A after the temporary establishment of connected state.

On the other hand, when the OS is, for example, Android (registered trademark), after the pairing state is implemented by exchanging the link key between the label printer 3 and the operation terminal 2, when a printing instruction is issued by the label printer 3, the operation terminal 2 and the label printer 3 are connected to each other so that data can be transmitted and received, and transition is made from the pairing state to the connected state. Then, when printing corresponding to the printing instruction is ended, the connected state in which data can be transmitted and received is forcibly released and the pairing state is restored. The Android described above corresponds to an example of the second OS described in the claims.

In the case of such a type of OS, the operation terminal 2 and the label printer 3 automatically enter disconnected state after the print data is transmitted and received and it is not necessary to reconnect, but it is desirable for the label printer 3 of the present embodiment to voluntarily enter the disconnected state at this timing.

As described above, in the connection confirmation sequence by the label printer 3 of the present embodiment, it is desirable to switch the contents and order of each control procedure in detail according to the type of OS of the operation terminal 2 targeted for connection target.

<Control Procedure of Connection Permission/Prohibition Confirmation Sequence 1>

Figure 7A:
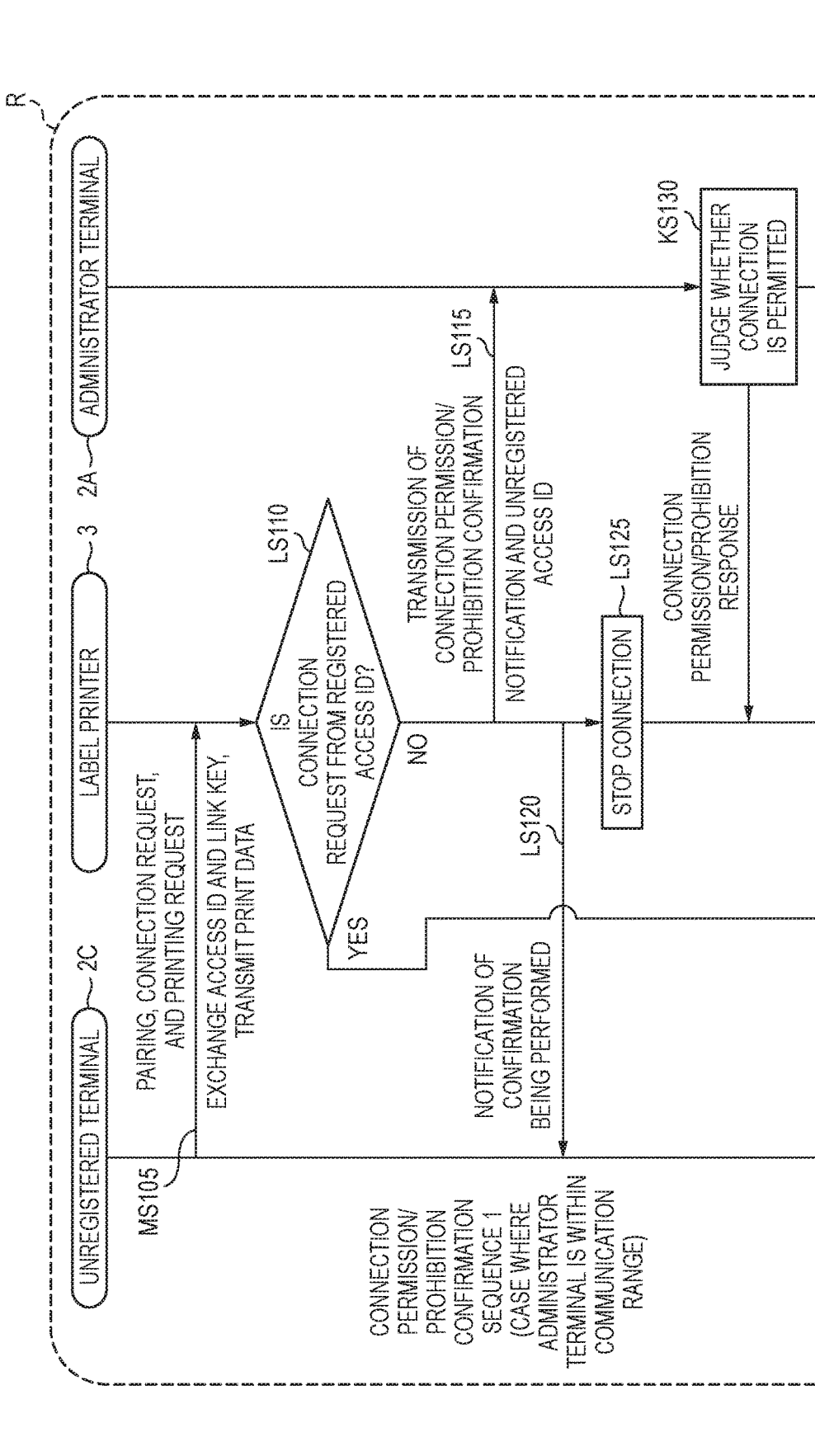
FIGS. 7A and 7B are sequence charts illustrating a processing procedure of the connection permission/prohibition confirmation sequence executed by a control circuit of a label printer and a CPU of each operation terminal.
Figure 7B:
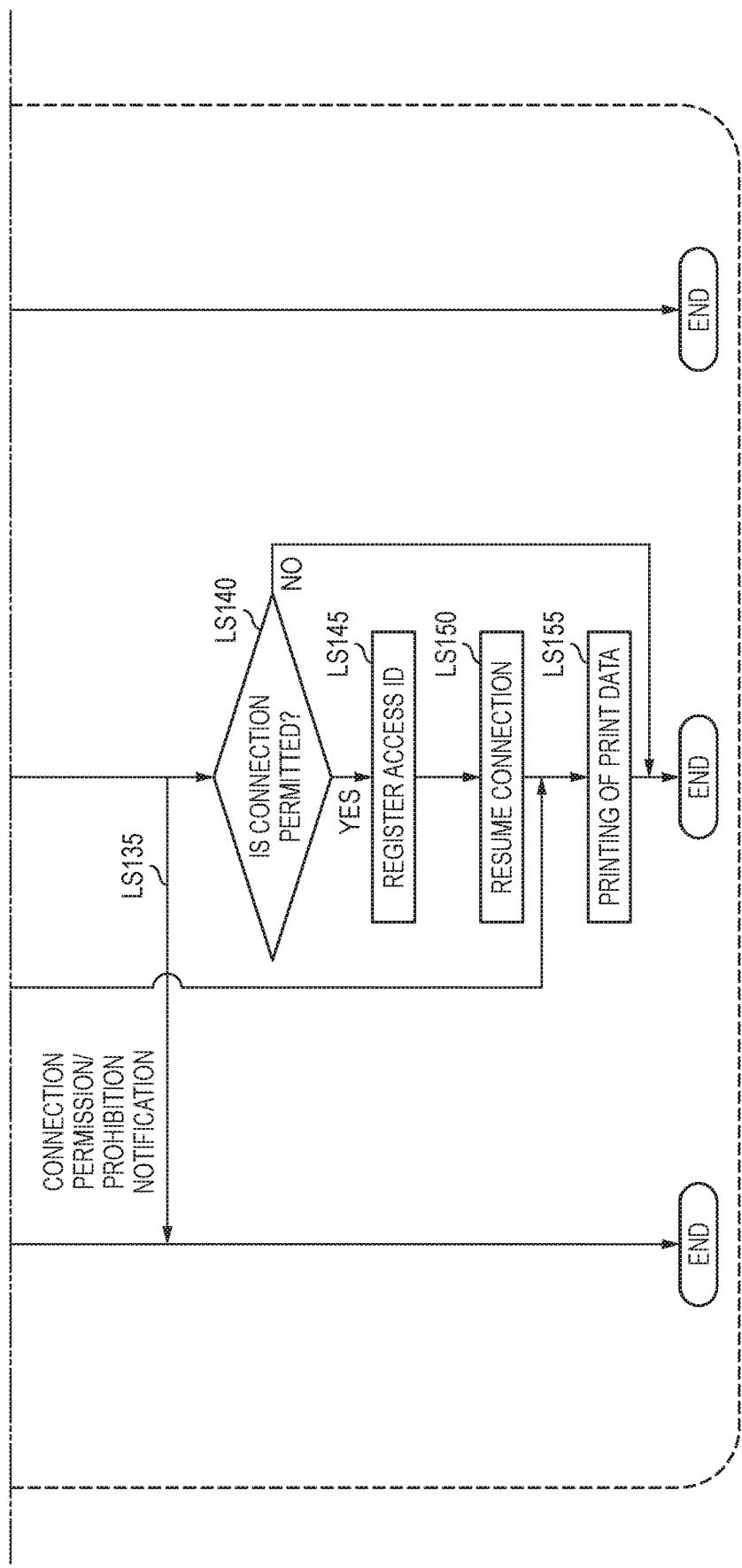

A control procedure executed by the control circuit 201 of the label printer 3 and the CPU 12 of each operation terminal 2 in order to implement the connection permission/prohibition confirmation sequence 1 described above will be described with reference to a sequence chart of FIGS. 7A and 7B. The sequence chart of the connection permission/prohibition confirmation sequence 1 illustrated in FIGS. 7A and 7B is executed when it is detected in advance that the administrator terminal 2A is within the communication range R of the label printer 3.

First, in step MS105, the CPU 12 of the unregistered terminal 2C exchanges the access information and the link key with the label printer 3 and transmits print data to the label printer 3 to execute pairing, connection request, and printing request. The detailed contents and order of the control procedure at this time are appropriately handled according to the type of OS of the unregistered terminal 2C as described above.

Next, in step LS110, the control circuit 201 of the label printer 3 determines whether the access information of the operation terminal 2 which is the transmission source of the connection request is registered. The procedure of step LS110 corresponds to an example of the registration determination process described in the claims. When it is determined that the access information is already registered, the determination is satisfied (YES in LS110), and the control procedure proceeds to step LS155 described later.

On the other hand, when it is determined that the access information is unregistered, the determination is not satisfied (NO in LS110), and the control procedure proceeds to step LS115.

In step LS115, the control circuit 201 of the label printer 3 transmits the connection permission/prohibition confirmation notification to the administrator terminal 2A together with unregistered access information. The procedure of step LS115 corresponds to an example of the release confirmation process and the first notification transmission process described in the claims.

Next, in step LS120, the control circuit 201 of the label printer 3 transmits the notification-of-confirmation-being-performed indicating that permission/prohibition of connection is being confirmed to the unregistered terminal 2C. With this configuration, the user of the unregistered terminal 2C can grasp that the permission/prohibition of connection is being confirmed. The procedure of this step LS120 corresponds to an example of the second notification transmission process described in the claims.

Next, in step LS125, the control circuit 201 of the label printer 3 temporarily stops the connected state with the unregistered terminal 2C. The detailed contents and order of the control procedure at this time are appropriately handled according to the type of OS of the unregistered terminal 2C as described above. The procedure of step LS125 corresponds to an example of the connection suspension process described in the claims.

During this period, the administrator refers to the access information to judge whether the connection is permitted, and operates the administrator terminal 2A to input the judgment content thereof. With this configuration, in step KS130, the CPU 12 of the administrator terminal 2A transmits the connection permission/prohibition response reflecting the judgment content thereof to the label printer 3. The process in which the label printer 3 receives the connection permission/prohibition at this time corresponds to an example of the permission/prohibition reception process described in the claims.

Next, in step LS135, the control circuit 201 of the label printer 3 transmits the connection permission/prohibition notification corresponding to the judgment content of the connection permission/prohibition response received in step KS130 to the unregistered terminal 2C. With this configuration, the user of the unregistered terminal 2C can grasp the judgment content as to whether the connection is permitted.

Next, in step LS140, the control circuit 201 of the label printer 3 determines whether the connection is permitted as the judgment content of the connection permission/prohibition response received in step KS130. When it is determined that the connection is not permitted as the judgment content, the determination is not satisfied (NO in LS140), the print data is erased, the connected state is completely finished, and this sequence is ended. The detailed contents and order of the control procedure at this time are appropriately handled according to the type of OS of the unregistered terminal 2C as described above.

On the other hand, when it is determined that the connection is permitted as the judgment content of the received connection permission/prohibition response, the determination is satisfied (YES in LS140), and the control procedure proceeds to step LS145.

In step LS145, the control circuit 201 of the label printer 3 records a check mark in the registration flag corresponding to the access information of the unregistered terminal 2C in the pairing terminal access information management table and registers the access information. The procedure of step LS145 corresponds to an example of the device information registration process and the erasure disabling process described in the claims.

Next, the control procedure proceeds to step LS150, the control circuit 201 of the label printer 3 resumes the connected state stopped in step LS125. The detailed contents and order of the control procedure at this time are appropriately handled according to the type of OS of the unregistered terminal 2C as described above. The procedure of this step LS150 corresponds to an example of the suspension release process described in the claims.

Next, the control procedure proceeds to step LS155, the control circuit 201 of the label printer 3 prints the print data received in step MS105 to create the print label L. In this way, by using the print data received before the connection is stopped, it is possible to save the trouble of newly transmitting and receiving the print data after the connection is resumed, and the work is simplified. Then, this sequence is ended.

<When Administrator Terminal is not within Communication Range: Sequence 2>

Figure 8:
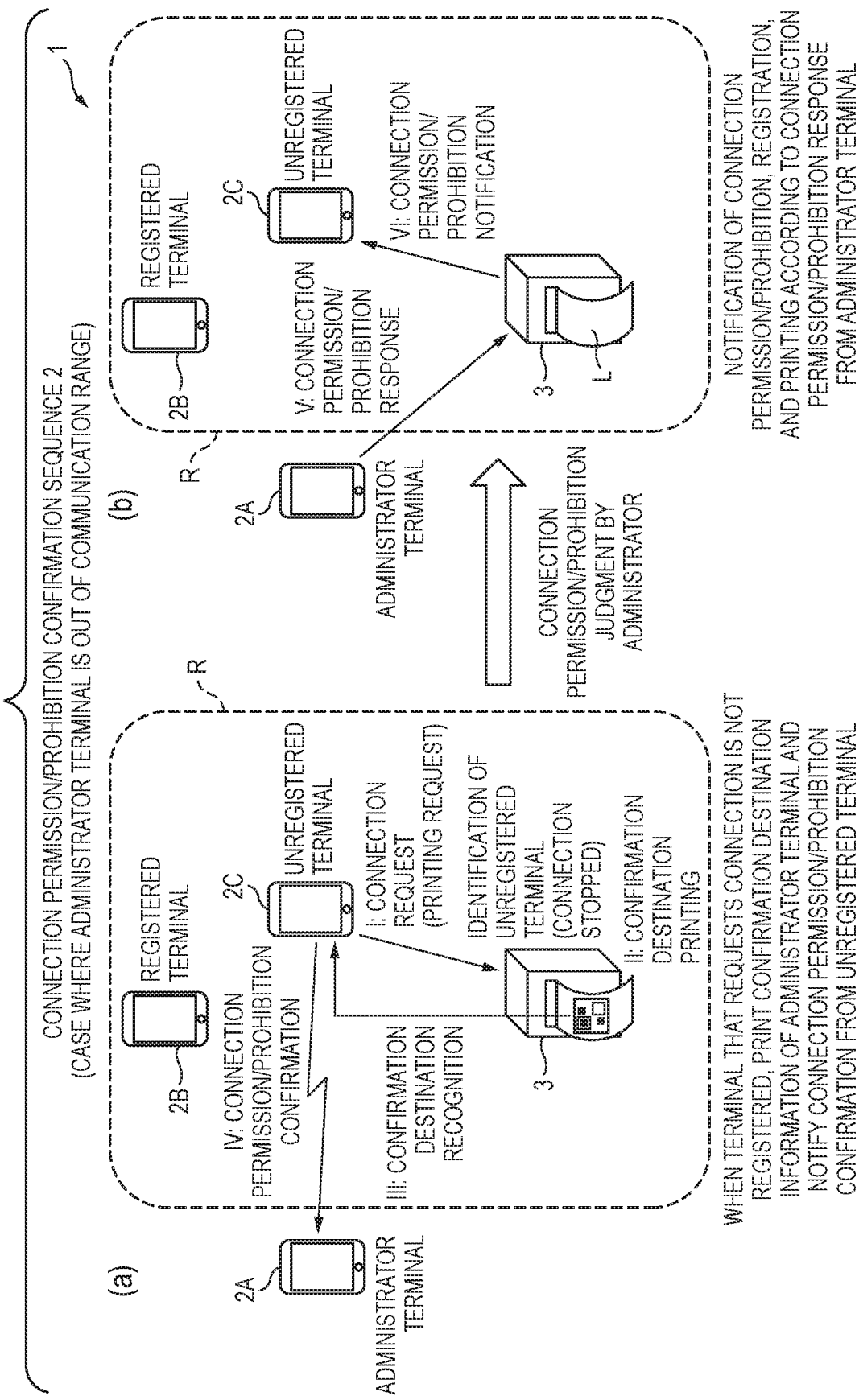
FIG. 8 illustrates steps of connection permission/prohibition confirmation sequence 2 when the administrator terminal is not within the communication range, where section (a) of FIG. 8 is a step chart before the connection permission/prohibition judgment, and section (b) of FIG. 8 is a step chart after the connection permission/prohibition judgment.

Next, as illustrated in FIG. 8, a connection permission/prohibition confirmation sequence 2 executed when the administrator terminal 2A is not within the communication range R of the label printer 3 will be described.

First, in section (a) on the left side of FIG. 8, when the unregistered terminal 2C transmits a connection request (printing request) to the label printer 3, the link key is exchanged and the connected state is temporarily established, and the operation terminal 2 also transmits the print data together with the access information (I: connection request (printing request)). When it is identified that the transmission source thereof is the unregistered terminal 2C, the label printer 3 that receives this connection request temporarily stops the connected state while saving the print data, and then prints the email address of the administrator terminal 2A as confirmation destination information (II: confirmation destination printing). As for the print content of the confirmation destination information, the email address recorded in the administrator terminal access information storage 201Aa may be printed in the character notation as it is, or as illustrated in the figure, the print content may be converted into a QR code (registered trademark) and printed. The email address described above corresponds to an example of the access information of the specific external device described in the claims.

The user of the unregistered terminal 2C causes the unregistered terminal 2C to recognize the email address of the printed confirmation destination information (III: confirmation destination recognition), and transmits email prompting the administrator to judge whether the connection is permitted based on the mail address together with the access information of the unregistered terminal 2C as a permission/prohibition confirmation notification of connection (IV: connection permission/prohibition confirmation). At this time, the email may be transmitted via a general telephone line (not particularly illustrated) or a separate communication network.

Then, the administrator who receives the email of the connection permission/prohibition confirmation notification judges whether the connection is permitted by referring to the access information, and as illustrated in section (b) on the right side of FIG. 8, a connection permission/prohibition response reflecting the judgment content thereof is transmitted from the administrator terminal 2A to the label printer 3 (V: connection permission/prohibition response). The label printer 3 which receives the connection permission/prohibition response transmits the connection permission/prohibition notification indicating the same content as the judgment content thereof to the unregistered terminal 2C (VI: connection permission/prohibition notification), and then executes registration and printing of the unregistered terminal 2C according to the judgment content. The connection permission/prohibition notification in the case of indicating the judgment content of permitting connection corresponds to an example of the notification indicating that printing is possible described in the claims.

<Control Procedure of Connection Permission/Prohibition Confirmation Sequence 2>

Figure 9A:
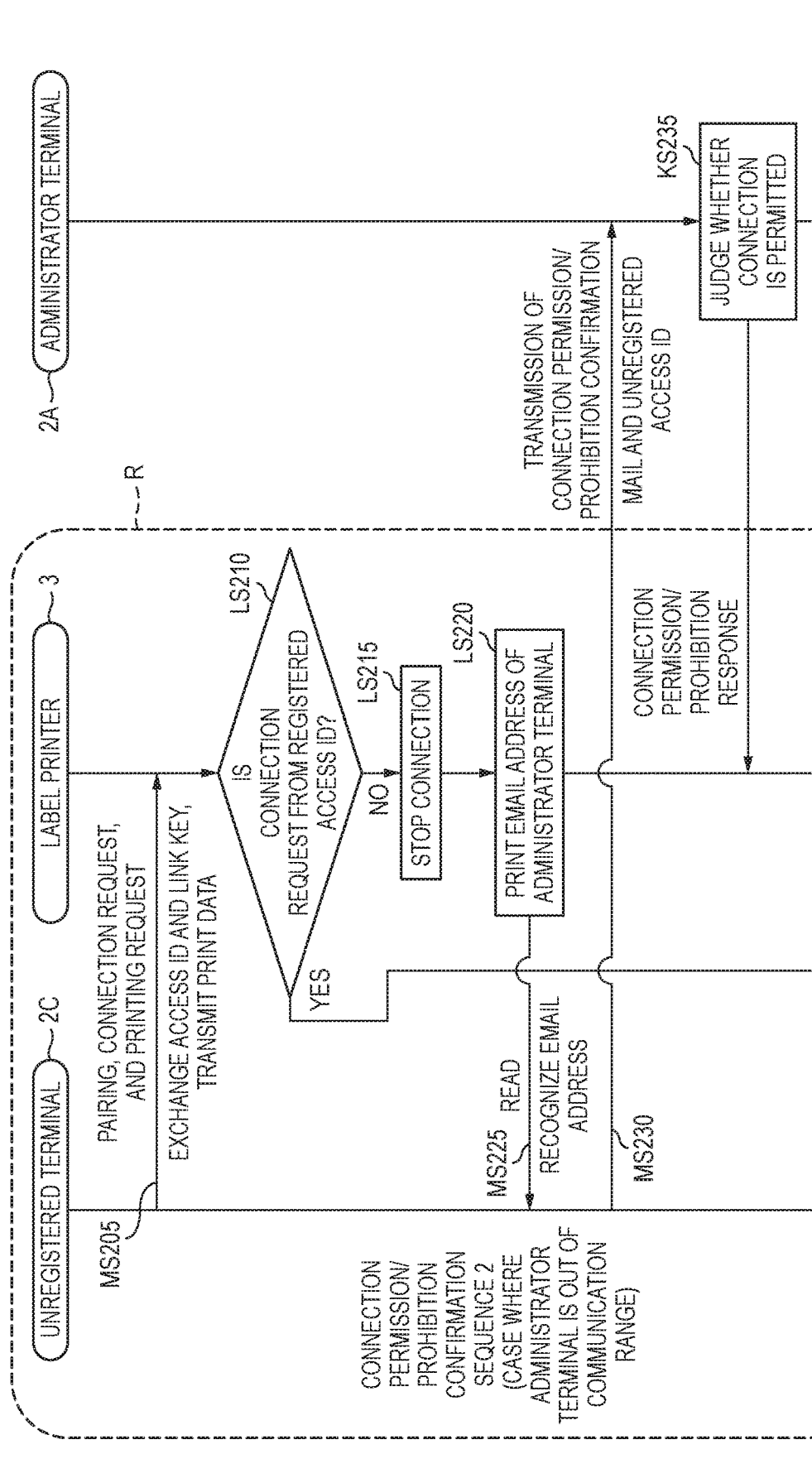

A control procedure executed by the control circuit 201 of the label printer 3 and the CPU 12 of each operation terminal 2 in order to implement the connection permission/prohibition confirmation sequence 2 described above will be described with reference to a sequence chart of FIGS. 9A and 9B. The sequence chart of the connection permission/prohibition confirmation sequence 2 illustrated in FIGS. 9A and 9B is executed when it is detected in advance that the administrator terminal 2A is not within the communication range R of the label printer 3.

First, in step MS205, the CPU 12 of the unregistered terminal 2C exchanges the access information and the link key with the label printer 3 and transmits print data to the label printer 3 to execute pairing, connection request, and printing request. The detailed contents and order of the control procedure at this time are appropriately handled according to the type of OS of the unregistered terminal 2C as described above.

Next, in step LS210, the control circuit 201 of the label printer 3 determines whether the access information of the operation terminal 2 which is the transmission source of the connection request is already registered. When it is determined that the access information is already registered, the determination is satisfied (YES in LS210), and the control procedure proceeds to step LS260 described later.

On the other hand, when it is determined that the access information is unregistered, the determination is not satisfied (NO in LS210), and the control procedure proceeds to step LS215.

In step LS215, the control circuit 201 of the label printer 3 temporarily stops the connected state with the unregistered terminal 2C. The detailed contents and order of the control procedure at this time are appropriately handled according to the type of OS of the unregistered terminal 2C as described above.

Next, the control procedure proceeds to step LS220, the control circuit 201 of the label printer 3 prints the email address of the administrator terminal 2A as confirmation destination information. The procedure of step LS220 corresponds to an example of the access information printing process described in the claims.

Next, the control procedure proceeds to step MS225, and the CPU 12 of the unregistered terminal 2C recognizes the email address printed in step LS220.

Next, the control procedure proceeds to step MS230, and the CPU 12 of the unregistered terminal 2C transmits the connection permission/prohibition confirmation notification for prompting the permission/prohibition determination of connection to the administrator terminal 2A by email, together with the access information of the unregistered terminal 2C, based on the email address recognized in step MS225.

After that, the administrator refers to the access information to judge whether the connection is permitted, and operates the administrator terminal 2A to input the judgment content thereof. With this configuration, in step KS235, the CPU 12 of the administrator terminal 2A transmits the connection permission/prohibition response reflecting the judgment content to the label printer 3.

Next, in step LS240, the control circuit 201 of the label printer 3 transmits the connection permission/prohibition notification corresponding to the judgment content of the connection permission/prohibition response received in step KS235 to the unregistered terminal 2C. With this configuration, the user of the unregistered terminal 2C can grasp the judgment content of the connection permission/prohibition. The procedure of this step LS240 in the case of transmitting the connection permission/prohibition notification indicating the judgment content of permitting connection corresponds to an example of the third notification transmission process described in the claims.

Next, in step LS245, the control circuit 201 of the label printer 3 determines whether the connection is permitted as the judgment content of the connection permission/prohibition response received in step KS235. When it is determined that the connection is not permitted as the judgment content, the determination is not satisfied (NO in LS245), the print data is erased, the connected state is completely finished, and this sequence is ended. The detailed contents and order of the control procedure at this time are appropriately handled according to the type of OS of the unregistered terminal 2C as described above.

On the other hand, when the connection is permitted as the judgment content of the received connection permission/prohibition response, the determination is satisfied (YES in LS245), and the control procedure proceeds to step LS250.

In step LS250, the control circuit 201 of the label printer 3 records a check mark in the registration flag corresponding to the access information of the unregistered terminal 2C in the pairing terminal access information management table and registers the access information.

Next, the control procedure proceeds to step LS255, the control circuit 201 of the label printer 3 resumes the connected state stopped in step LS215. The detailed contents and order of the control procedure at this time are appropriately handled according to the type of OS of the unregistered terminal 2C as described above.

Next, the control procedure proceeds to step LS260, the control circuit 201 of the label printer 3 prints the print data received in step MS105 to create the print label L. Then, this sequence is ended.

<Advantages>

As described above, in the present embodiment, when a connection is made from an unknown operation terminal 2, a suspension state of connection (connection stopped) is temporarily established, and then confirmation is made by the administrator terminal 2A, for which security is ensured, and then the suspension state is released and printing can be executed. With this configuration, it is possible to enhance security as compared with the case where printing is possible by unnecessarily connecting to an unspecified operation terminal 2. As a result, security can be enhanced in wireless communication with the operation terminal 2.

Particular in the present embodiment, in the connection permission/prohibition confirmation sequence 1, by the procedure of step LS115, a connection permission/prohibition confirmation notification as to whether the stopping state of connection of the unregistered terminal 2C may be released is transmitted to the administrator terminal 2A connected to the label printer 3.

With this configuration, in the state where the registered administrator terminal 2A is connected to the label printer 3, it is possible to notify the administrator who is the user of the administrator terminal 2A that connection is made from the unknown operation terminal 2 to the label printer 3. Further, it is possible to allow the administrator to judge whether printing can be performed using the print data from the unknown operation terminal 2.

Particularly, in the present embodiment, in the connection permission/prohibition confirmation sequence 1, in the procedure of step LS120, the notification-of-confirmation-being-performed that the connection permission/prohibition notification is being transmitted to the administrator terminal 2A is notified to the unregistered terminal 2C. With this configuration, it is possible to notify the user of the unregistered terminal 2C newly connected to the label printer 3 that the label printer 3 is waiting for obtaining printing permission.

Particularly, in the present embodiment, the operating system of the operation terminal 2 is either iOS (registered trademark) or Android (registered trademark). In iOS (registered trademark), the operation terminal 2 and the label printer 3 are connected to each other by exchanging the link key between the label printer 3 and the operation terminal 2 and implementing the data transmission/reception state between the operation terminal 2 and the label printer 3. In Android (registered trademark), the operation terminal 2 and the label printer 3 are connected to each other by exchanging the link key between the label printer 3 and the operation terminal 2 and implementing the pairing state, the operating terminal 2 and the label printer 3 transits to a data transmission/reception state when a printing instruction is issued by the operating terminal 2 after the connection, and the data transmission/reception state is released and the pairing state is restored when the printing corresponding to the printing instruction is ended after the transition to the data transmission/reception state. Then, in the pairing terminal access information management table storage 201Ab, the link key when exchanging the link key with the operation terminal 2 is stored, and furthermore, in the procedure of step LS145, the link key of the registered terminal 2B, which is registered, stored in the pairing terminal access information management table storage 201Ab is made non-erasable.

In the label printer 3 of the present embodiment, when a connection using each OS of iOS (registered trademark) or Android (registered trademark) is made, the link key is exchanged with the operation terminal 2, and the link key is sequentially stored in the pairing terminal access information management table storage 201Ab. Normally, the number of link keys stored in this way is finite, and when the number of link keys exceeds the upper limit, the oldest link keys are deleted in order.

In this case, in the present embodiment, the link key of the registered terminal 2B which is registered is made non-erasable by recording the check mark in the registration flag. With this configuration, the link key of the registered terminal 2B can be removed from the deletion target, and thus when a connection is made from an unknown operation terminal 2, the fact thereof can be surely notified to the administrator of the administrator terminal 2A.

Particularly, in the present embodiment, in the connection permission/prohibition confirmation sequence 2, the transport device 209 and the print head 204 are controlled in the procedure of step LS220, and the email address of the administrator terminal 2A is formed on the tape 202.

With this configuration, when the administrator terminal 2A is not connected to the label printer 3 (the printing permission from the administrator of the administrator terminal 2A cannot be obtained as it is), the user of the unregistered terminal 2C can access (transmits an email) the administrator terminal 2A based on the mail address (or its QR code (registered trademark)) formed on the tape 202 and obtain the print permission for printing using the print data from the unregistered terminal 2C.

Particularly, in the present embodiment, in the connection permission/prohibition confirmation sequence 2, in the procedure of step LS240, when the connection permission/prohibition response having the content of permitting connection is received, the connection permission/prohibition notification indicating that printing is possible is issued to the unregistered terminal 2C.

With this configuration, it is possible to inform the user of the unregistered terminal 2C that printing permission is obtained from the administrator of the administrator terminal 2A and printing can be performed using the print data from the unregistered terminal 2C.

If the print data is already received from the unregistered terminal 2C when a connection permission/prohibition notification having the content of permitting connection as described above is transmitted, the connection permission/prohibition notification may be transmitted including the content of confirming "Do you want to print the print data from before?" in the connection permission/prohibition notification. Then, the label printer 3 may determine whether to execute printing of the print data according to the reply content from the unregistered terminal 2C.

If the print data is not received yet, a connection permission/prohibition notification including a content of requesting that "Connection is permitted. Please transmit print data." may be transmitted. Then, the label printer 3 may receive and print the print data from the unregistered terminal 2C.

In the description as above, the arrows illustrated in each of FIGS. 1 and 2 indicate an example of the signal flow, and do not limit the signal flow direction.

The sequence charts illustrated in FIGS. 7 and 9 are not intended to limit the present invention to the procedures illustrated in the flows of the sequences described above, and a procedure may be added or deleted, or the order thereof may be changed without departing from the scope and technical idea of the invention.

The printing apparatus of the present disclosure can be connected to a plurality of external devices by wireless communication via the communication unit. Meanwhile, if the printing apparatus is capable of printing by unnecessarily connecting to an unspecified external device, it not be preferable from the viewpoint of ensuring security.

Therefore, in the present disclosure, the device information registration process and the registration determination process are executed by the controller. That is, first, in the device information registration process, for example, regarding the specific external device for which security is ensured, such as the external devices of the administrator of the printing apparatus, device information of the specific external device is registered in the storage. The device information includes, for example, access information such as Bluetooth (registered trademark) address, identification information of the external device itself, and the like.

When one external device newly makes an access and connection is made via the communication unit in a state where the registration is made as described above, it is determined, in the registration determination process, whether the device information of the external device is already registered. When it is determined that the device information is not registered, the connection to the new external device described above temporarily enters a suspension state (connection suspension process).

After that, the external device (specific external device for which safety insecurity is ensured) already registered by the device information registration process described above is prompted to confirm whether the suspension state of the new external device may be released (release confirmation process). In response to this, a notification as to whether the suspension state may be released is transmitted from the registered external device and is received by the controller (permission/prohibition reception process). Then, when the notification that the suspension state may be released is received, the suspension state of the new external device is released. With this configuration, the printing process in the printing apparatus can be executed using print data transmitted from the external device.

As described above, in the printing apparatus of the present disclosure, when a connection is made from an unknown external device, the unknown external device temporarily enters the suspension state of connection, after that, a confirmation is made by the specific external device for which safety in security is ensured, and then the suspension state is released and printing is possible. With this configuration, it is possible to enhance security as compared with the case where printing is possible by unnecessarily connecting to an unspecified external device.

In addition to the matters described above, the methods according to the embodiment described above and each modification may be appropriately combined and used.

In addition, although not illustrated one by one, the present invention may be embodied with various modifications within a range not departing from the spirit thereof.

What is claimed is:

1. A printing apparatus comprising:
   a transporter configured to transport a printing medium;
   a print device configured to form a print on the printing medium;
   a communication interface configured to perform a wireless communication with a plurality of external devices by a mutual recognition wireless communication method;
   a storage storing information; and
   a controller configured to perform:
      registering device information of specific external device in the storage;
      determining whether the device information of one external device newly connected to the printing apparatus via the communication interface is registered in the storage;
      in a case it is determined that the device information is not registered, making connection to said one external device a suspension state;
      prompting the external device registered in the storage to confirm whether to release the suspension state of said one external device;
      receiving, from the external device registered, a notification of permission/prohibition of release of the suspension state; and
      in a case the received notification indicates releasing permission of the suspension state, releasing the suspension state in said one external device.

2. The printing apparatus according to claim 1, wherein in the prompting, the controller is configured to perform transmitting, to the specific external device connected to the printing apparatus via the communication interface, a confirmation request notification as to whether to release the suspension state of said one external device.

3. The printing apparatus according to claim 2, wherein the controller is further configured to perform notifying said one external device that the transmitting of the confirmation request notification is being performed for the specific external device.

4. The printing apparatus according to claim 2,
   wherein an operating system of the external device is one of:
      a first OS, in which the external device and the printing apparatus are connected to each other by exchanging a link key between the printing apparatus and the external device to implement a data transmission/reception state between the external device and the printing apparatus; and
      a second OS, in which the external device and the printing apparatus are connected to each other by exchanging a link key between the printing apparatus and the external device to implement a pairing state, the external device and the printing apparatus making a transition to a data transmission/reception state in a case a printing instruction is issued by the external device after the connection, and the data transmission/reception state being released and the pairing state being restored in a case printing corresponding to the printing instruction is ended after the transition,
   wherein the storage stores the link key when exchanging the link key with the external device, and
   wherein the controller is further configured to perform making the link key of the registered external device stored in the storage non-erasable.

5. The printing apparatus according to claim 1, wherein in the prompting, the controller is configured to perform controlling the transporter and the print device to form access information of the specific external device on the printing medium.

6. The printing apparatus according to claim 1,
   wherein in a case the received notification indicates releasing permission of the suspension state, the controller is further configured to perform issuing a notification that printing is possible to said one external device.

* * * * *